United States Patent [19]

Black

[11] Patent Number: 5,141,022

[45] Date of Patent: * Aug. 25, 1992

[54] PRESSURE REGULATING VALVE APPARATUS

[75] Inventor: W. Keith Black, Salina, Kans.

[73] Assignee: Cashco, Inc, Ellsworth, Kans.

[*] Notice: The portion of the term of this patent subsequent to Dec. 10, 2008 has been disclaimed.

[21] Appl. No.: 796,605

[22] Filed: Nov. 21, 1991

Related U.S. Application Data

[63] Continuation of Ser. No. 508,364, Apr. 12, 1990, Pat. No. 5,070,901.

[51] Int. Cl.⁵ ............................................. G05D 16/08
[52] U.S. Cl. .............................. 137/495; 137/505.41; 251/284
[58] Field of Search .................... 137/495, 505.41, 523; 251/284

[56] References Cited

U.S. PATENT DOCUMENTS

| | | | |
|---|---|---|---|
| 392,447 | 11/1888 | Meyer | 137/505.41 |
| 3,451,421 | 6/1969 | Vicenzi et al. | 137/495 |
| 3,590,860 | 7/1971 | Stenner | 137/495 |
| 3,683,955 | 8/1972 | Beynon | 137/495 |
| 4,043,357 | 8/1977 | Gocke | 137/495 |
| 4,275,764 | 6/1981 | Baret | 137/505.41 X |
| 5,070,901 | 12/1991 | Black | 137/495 |

Primary Examiner—Stephen M. Hepperle
Attorney, Agent, or Firm—Hovey, Williams, Timmons & Collins

[57] ABSTRACT

A fluid pressure regulating valve apparatus for controlling either upstream or downstream fluid pressure includes a lower housing including a lower interior space and an upper housing including an upper interior space which is separated from the lower space by a deformable diaphragm. The diaphragm and lower space together define a substantially smooth, generally void free fluid receiving cavity with which first and second conduits are connected. The first conduit includes a constriction and the second conduit is angled relative to the first conduit. A valve is provided including a valve closure member movable between flow-permitting and flow-preventing positions. An upper stem element is connected to the diaphragm and extends through the upper interior space to an upper and disposed exterior of the upper housing such that pressure regulation and regulator adjustment may both be carried out from outside the lower housing.

17 Claims, 3 Drawing Sheets

PRESSURE REGULATING VALVE APPARATUS

This is a continuation of application Ser. No. 07/508,364, filed on Apr. 12, 1990, now U.S. Pat. No. 5,070,901.

BACKGROUND OF THE INVENTION

1. Field of the Invention

The present invention relates generally to flow control valves and, more particularly, to an apparatus for regulating either the upstream or downstream pressure of fluid being controlled by the apparatus.

2. Discussion of the Prior Art

It is known to provide valve devices in fluid supply systems for controlling the fluid pressure at a desired location in the system. For example, in a fluid dispensing arrangement, it is conventional to provide a pressure regulating valve apparatus upstream of a dispensing device in order to control the pressure of fluid being pumped to the dispensing device.

In this known type of system, the regulating device is referred to as a downstream pressure regulator because it controls the pressure of fluid downstream of the valve apparatus and maintains a desired predetermined pressure of fluid at the dispensing apparatus. It is also possible to have similar applications where an upstream regulating valve apparatus is used which maintains a predetermined pressure in the fluid upstream of the valve.

Although these known pressure regulating devices have been found satisfactory in numerous applications, certain drawbacks are evident when such devices are employed in systems requiring a regulation of the pressure of clean fluids such as ingestible medicines or beverages. In the food industry, it is necessary to provide a relatively smooth surface throughout the flow path of fluids being dispensed in order to reduce the opportunity for the fluid to get caught up within the system and stagnate. Thus, it is important to present as few voids and interstices as possible to the fluid in an effort to reduce such stagnation. Further, frequent cleaning of all fluid dispensing equipment is necessary in order to protect against the presence of germs in the system which adversely effect the quality of the fluids being handled.

In view of these special needs in the food and medicine industries, it may be understood that a regulating device having a complex internal mechanical construction would not be well suited for use in regulating the pressure of an ingestible fluid. Such intricate constructions result in a device which is difficult to clean and which permits fluid to get caught up in voids and interstices within the fluid flow path such that stagnation is promoted.

OBJECTS AND SUMMARY OF THE INVENTION

It is an object of the present invention to provide a pressure regulating apparatus which overcomes the drawbacks noted above and which is capable of use in regulating fluid pressures within systems for handling ingestible fluids such as clean gases, medicines and beverages.

It is another object of the invention to provide a pressure regulating apparatus which permits ready confirmation of the position of a valve closure member from a position exterior of the apparatus in order to simplify the use of the device and improve the safety considerations involved in its use.

Further, yet another object of the invention is to provide a fluid pressure regulating apparatus capable of being locked in a flow-permitting position so that the apparatus may be cleaned without upsetting the pressure level at which a regulating means of the apparatus is positioned.

In accordance with one aspect of the invention, a fluid pressure regulating valve apparatus includes a lower housing including a lower interior space, an upper housing assembly including an upper housing defining an upper interior space, and a deformable diaphragm separating the lower interior space from the upper interior space. The diaphragm, together with the lower interior space, defines a fluid receiving cavity, and first and second conduits communicate with the fluid receiving cavity, the second conduit being offset from the first conduit.

A valve is provided including a valve closure member connected with the diaphragm so that the closure member and diaphragm are movable together between a flow-permitting position and a flow-preventing position. An upper stem element is also connected to the diaphragm and extends through the upper interior space. An upper end of the upper stem element is disposed exterior of the upper housing.

The upper housing assembly further includes pressure regulating means for exerting a force on the diaphragm in a direction toward the lower interior space and regulating adjustment means for adjusting the force exerted on the diaphragm by the pressure regulating means.

According to other particular aspects of the invention, preferred downstream and upstream pressure regulating apparatuses are provided which are easy to clean and present smooth, relatively void-free fluid receiving cavities such that stagnation of fluid within the cavities is inhibited.

BRIEF DESCRIPTION OF THE DRAWING FIGURES

A preferred embodiment of the invention is described in detail below with reference to the attached drawing figures, wherein:

FIG. 7 is a bottom plan view of an inlet conduit of the upstream pressure control valve apparatus of FIG. 3.

DETAILED DESCRIPTION OF THE PREFERRED EMBODIMENT

Figure 1:
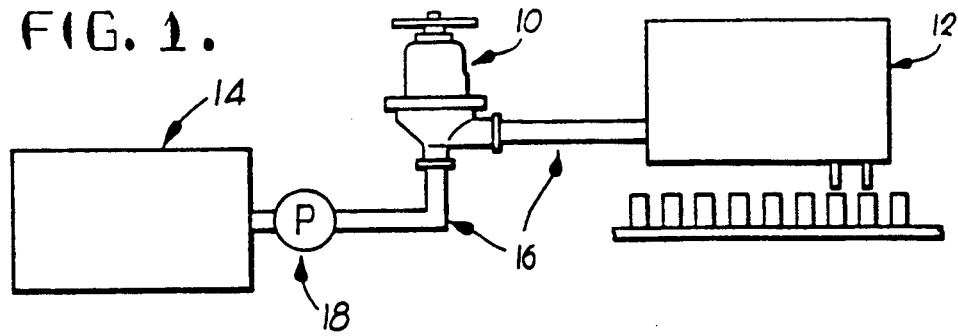
FIG. 1 is a schematic view of a fluid utilization system incorporating a downstream pressure control valve apparatus which is constructed in accordance with the present invention.

A fluid utilization system is illustrated in FIG. 1, which incorporates a downstream pressure regulating valve apparatus 10 constructed in accordance with a preferred embodiment of the present invention.

The fluid system includes a dispensing apparatus 12 for measuring out and dispensing a fluid product into portions suitable for bottling or packaging. A source of fluid, such as a tank or other container 14 of known construction is connected to the dispensing apparatus via a conduit 16, and a pump 18 is provided in the system to pressurize the fluid delivered to the dispensing apparatus.

The pressure regulating valve apparatus 10 is interposed between the pump 18 and the dispensing apparatus 12 for controlling the pressure of the fluid downstream of the valve apparatus such that the fluid at the dispensing apparatus is maintained at a generally constant pressure. By providing such regulation of the pressure of the fluid at the dispensing apparatus 12, it is possible to provide an accurate dispensing operation.

Figure 2:
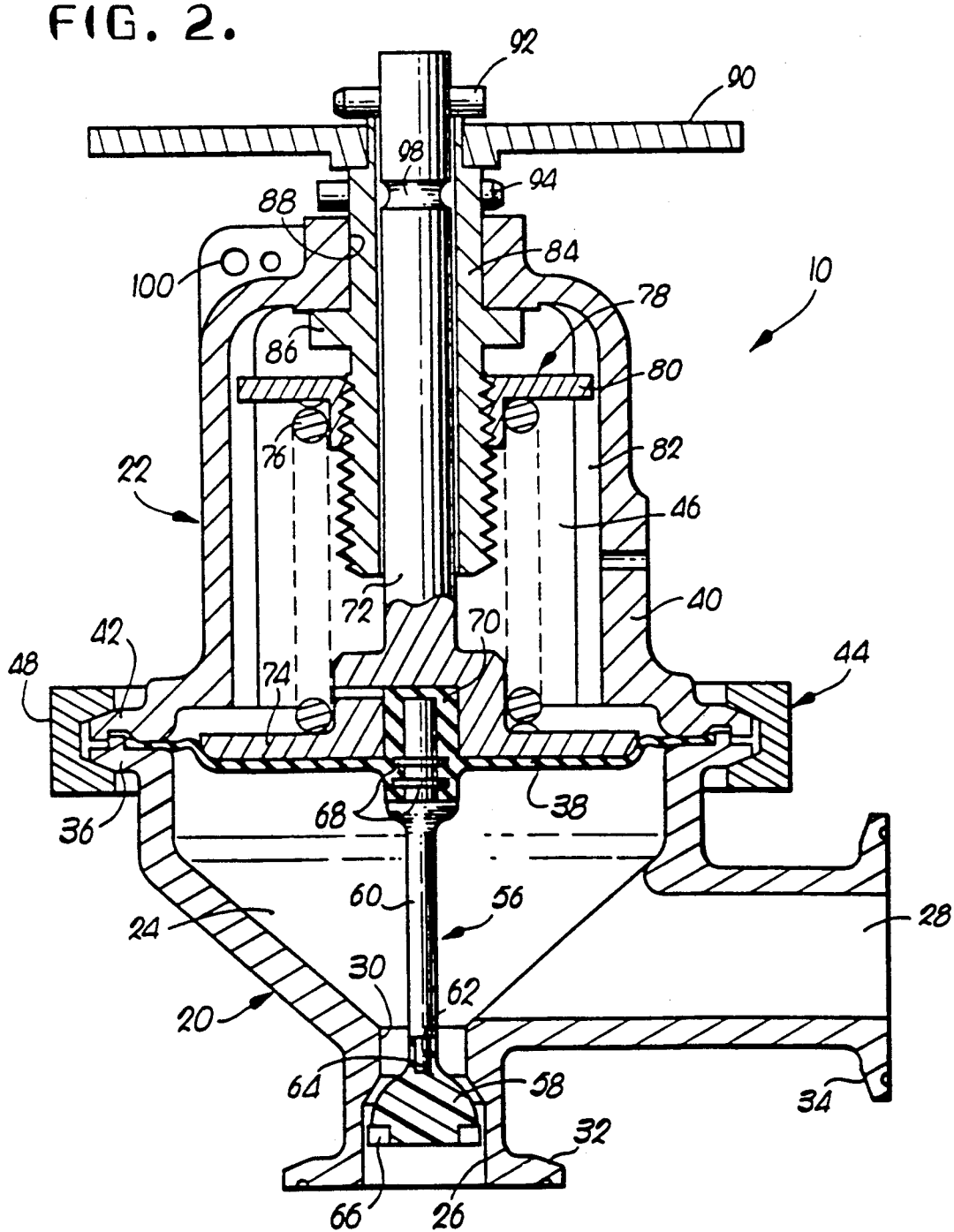
FIG. 2 is a side sectional view of a downstream pressure control valve in accordance with the invention.

The pressure regulating valve apparatus 10 is shown in more detail in FIG. 2, and includes generally a lower housing 20 and an upper housing assembly 22. The lower housing 20 includes a lower interior space 24 including a surface adapted to be exposed to fluid being handled by the apparatus. The exposed surface of the interior space 24 is relatively smooth, preferably being formed by polishing with various polishing expedients until the roughness is less than about $15R_a$, which is an accepted roughness in the food industry for contact surfaces in fluid treatment devices.

Inlet and outlet conduits 26, 28 are formed in the lower housing 20 which are each in communication with the lower interior space 24 and which are offset from one another, preferably by an angle of about ninety degrees. The inlet and outlet conduits 26, 28 include interior surfaces which, like the surface of the lower interior space 24, are polished to a surface roughness accepted by the food industry, and the inlet conduit 26 includes a constriction 30 having a function described below. Further, each conduit 26, 28 is preferably provided with a flange 32, 34 adjacent a termination end thereof which permits attachment of the apparatus 10 to the conduit 16 of the fluid handling system. Other known connection expedients, such as butt welding may, of course, be used.

A flange 36 is formed in the lower housing 20 adjacent an open end of the lower interior space 24 located opposite the inlet conduit 26, and defines a diaphragm bearing surface on which a diaphragm 38 is seated when the apparatus is assembled. The diaphragm 38 is formed of a relatively resilient material such as a food grade rubber, and is of a thickness less than about 40/1000 of an inch. This thickness may vary depending upon the loads to be experienced by the diaphragm during use and the types of materials available for use in the diaphragm. The surface of the diaphragm 38 which is exposed to the lower interior space 24 is preferably very smooth, having a roughness found acceptable for such uses by the food industry, e.g. less than about $15R_a$.

The upper housing assembly 22 includes an upper housing 40 which is also provided with a flange 42 of a size corresponding to the size of the flange 36. The upper housing 40 is adapted to mate with the lower housing 20 with the flanges 36, 42 opposing one another, and with the diaphragm 38 therebetween. A circular ring clamp 44 of conventional construction is used to secure the housings 20, 40 and diaphragm 38 together.

In addition, the upper housing 40 includes an upper interior space 46 that is separated from the lower interior space 24 by the diaphragm 38 when the apparatus is assembled such that the diaphragm and the lower interior space together define a fluid receiving cavity and the upper interior space 46 is isolated from contact with the fluid being handled by the apparatus.

Figure 4:
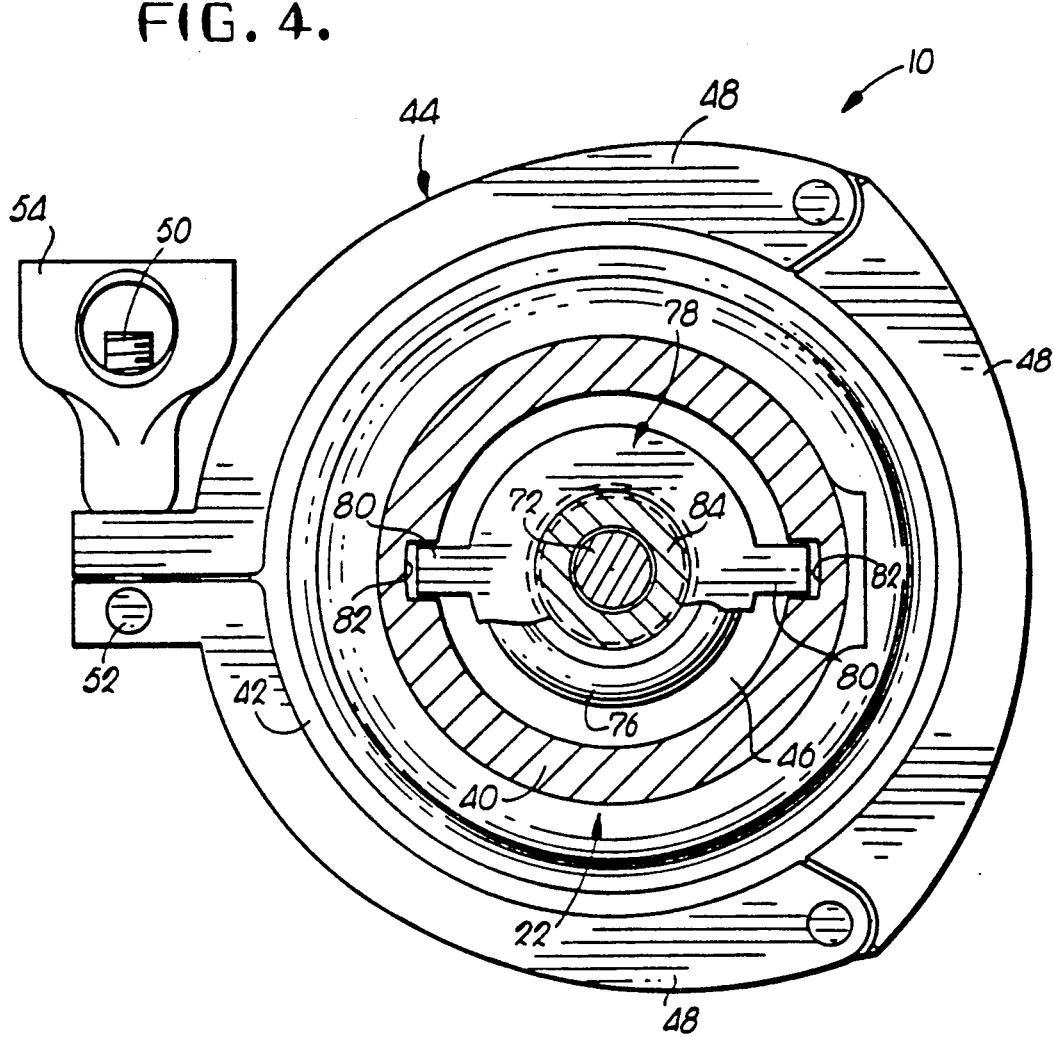
FIG. 4 is a top sectional view of the downstream control valve of FIG. 2.

The ring clamp 44 is illustrated in more detail in FIG. 4, and includes a plurality of clamp sections 48 and securing means for securing the clamp in place on the apparatus. The securing means includes a threaded rod 50, which is pivotally supported on one of the clamp sections 48 by a transverse pin 52, and a wing nut 54 or the like received on the threaded rod.

Returning to FIG. 2, a valve 56 is provided within the fluid receiving cavity and includes a valve closure member 58 disposed in the inlet conduit 26 opposite the constriction 30 from the fluid receiving cavity, and a lower stem 30 extending between the valve closure member 58 and the diaphragm 38 so that the closure member and diaphragm are movable together. When the diaphragm 38 is in a position biased toward the lower interior space 24, the closure member 58 is in a flow-permitting position such as that shown in FIG. 2, wherein the closure member is separated from the constriction 30 by a distance sufficient to permit the flow of fluid around the closure member and into the fluid receiving cavity.

Figure 6:
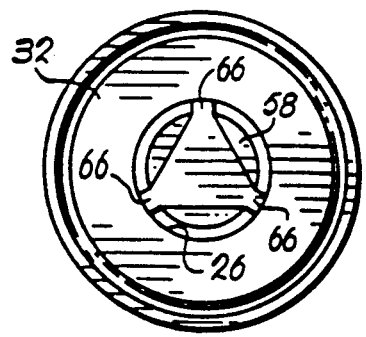
FIG. 6 is a bottom plan view of an inlet conduit of the downstream pressure control valve apparatus of FIG. 2.

If the diaphragm 38 is moved in a direction toward the upper interior space 46 from the flow permitting position, the closure member 58 is moved into a flow-preventing position in which the closure member seats against the constriction 30 to prevent the flow of fluid into the fluid receiving cavity. The closure member 58 is formed of a food grade material, preferably plastic, and is attached to the lower stem element 60 by a suitable adhesive which may be applied between a recess 62 of the closure member 58 and a relatively small diameter protrusion 64 formed on the end of the lower stem element 60. Also, as shown in FIG. 6, the closure member 58 includes a plurality of radially extending fingers 66 which center the closure member within the inlet conduit 26 while permitting fluid to flow around the closure member.

The stem element 60 is illustrated in FIG. 2, and is also preferably formed of a food grade material such as a food grade plastic. The stem element is provided with one or more ridges 68 adjacent the diaphragm-engaging end thereof. These ridges 68 provide a secure connection between the stem element 60 and a central hub 70 of the diaphragm 38 when the diaphragm is fastened or molded to the stem element.

An upper stem element 72 is also connected to the central hub 70 of the diaphragm 38 and extends in a direction opposite to the direction in which the lower stem element 60 extends. The upper stem element 72 extends through the upper interior space 46 and includes an end located outside of the upper housing 40 such that the position of the diaphragm 38, and thus the closure member 58, may be confirmed simply by noting the position of the end of the upper stem element relative to the upper housing. Thus, it is possible to determine whether the closure member 58 is in a flow-permitting or flow-preventing position merely by checking the position of the end of the upper stem element 72.

The upper stem element includes a bearing plate 74 in contact with the diaphragm 38 and adapted to bear against the diaphragm under the force of a pressure regulating means. This regulating means includes a compression spring 76 disposed within the upper interior space collinear with the upper stem element. The compression spring 76 is adapted to exert a predetermined compression load on the diaphragm 38 via the bearing plate 74 such that the diaphragm is normally biased toward the lower interior space 24 and the closure member 58 is retained in the flow-permitting position.

Adjustment means are provided on the upper housing assembly 22 for adjusting the magnitude of the force exerted on the diaphragm 38 by the compression spring 76. The adjustment means includes an axially movable collar 78 that is retained against rotational movement within the upper interior space 46 of the housing 40 by two radially extending tabs 80, shown in FIG. 4, which ride in a pair of axial grooves 82 formed in the upper housing. The adjustment means also includes a rotatable sleeve 84 interposed between the axially movable collar 78 and the upper stem element 72 and being freely rotatable relative to the upper stem element. The sleeve 84 and collar 78 are threaded and cooperate during rotation of the sleeve to adjust the axial position of the collar within the upper housing 40.

A flange 86 is formed on the sleeve 84 intermediate the ends thereof which prevents the sleeve from moving through an opening 88 in the upper housing. Axial movement of the sleeve in the opposite direction is prevented by the force exerted on the sleeve by the compression spring 76.

In order to rotate the sleeve 84 to carry out an adjustment of the regulating force of the spring 76, a handle 90 is provided which is fixed to the sleeve 84 for rotation therewith. For example, the handle 90 may be provided with a central opening having a square cross-sectional shape corresponding to a square section of the sleeve so that rotation of the handle translates into rotation of the sleeve 84.

Limit stop means are provided in the upper housing assembly 22 for limiting the movement of the diaphragm 38 in the direction of the force of the pressure regulating means. This limit stop means is necessary to prevent the compression spring 76 from pushing completely through the diaphragm material and into the lower interior space 24, and includes a pin or protrusion 92 at the end of the upper stem element 72 which is adapted to abut the top end of the sleeve 84 when the limit position of the valve closure member 58 is reached. When the valve closure member 58 is in the flow-preventing position, the pin or protrusion 92 is out of contact with the sleeve 84 and is elevated above the upper housing 40 by a noticeable height which serves as an indication of the closed position of the closure member 58.

Figure 5:
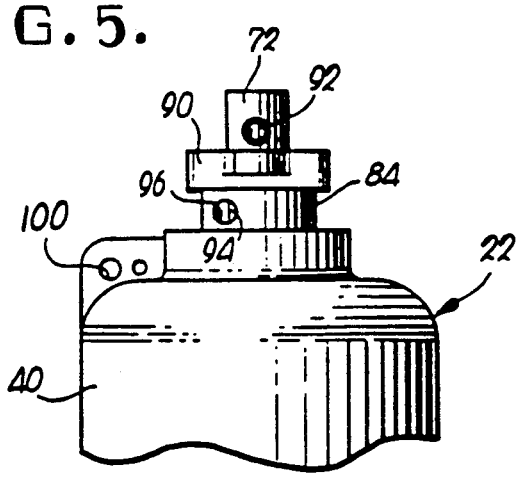
FIG. 5 is a partial front elevation view of the downstream pressure control valve of the present invention.

A further pin 94 is provided on the upper housing assembly 22 which may be positioned in a hole 96 formed in the sleeve, as shown in FIG. 5, and which also may engage a groove 98 formed in the upper stem element 72 in order to permit the upper stem element to be locked in the flow-permitting position. During normal operation of the apparatus 10, the pin 94 is removed from the hole 96 in the sleeve 84 and may be stored in an additional opening 100 provided on the upper housing.

During operation of the apparatus, the valve closure member 58 is normally biased in the flow-permitting position such that fluid under pressure enters the fluid receiving cavity via the inlet conduit 26 and exits the cavity through the outlet conduit 28. This fluid is used in some known type of fluid handling equipment downstream of the valve apparatus wherein it is desired that the fluid be maintained at a certain substantially constant pressure.

Assuming that the pressure regulating means of the apparatus is properly set, fluid is permitted to flow through the apparatus 10 until the pressure within the outlet conduit 28 and fluid receiving cavity reaches a pressure sufficient to cause the diaphragm 38 to move upward toward the upper interior space 46 against the biasing force of the compression spring 76. This upward movement of the diaphragm 38 is accompanied by upward movement of the closure member 58 toward the flow-preventing position wherein the member is in contact with the constriction 30. Thus, the flow of pressurized fluid into the cavity is reduced or prevented until the pressure within the cavity and downstream thereof falls to a threshold level at which the force of the spring 76 again moves the diaphragm 38 and closure member 58 back toward the flow-permitting position.

If it is desired to alter the pressure level at which the diaphragm 38 is moved to the flow-preventing position, the handle 90 is rotated in the appropriate direction in order to reposition the collar 78 within the upper interior space 46. If the collar 78 is moved upward away from the spring 76, the spring is relaxed and the stored energy within the spring is reduced such that less force is exerted on the diaphragm 38. By making this adjustment, less pressure is required within the fluid receiving cavity to cause movement of the diaphragm 38 and closure member 58 to the flow-preventing position.

Alternately, if the collar 78 is moved downward toward the spring 76, the spring is further loaded creating a situation where greater fluid pressure is required to offset the greater spring force.

Because the apparatus is constructed with a fluid receiving cavity which is generally free of mechanical parts and which is defined by walls having a polished surface, no voids or interstices are presented to fluid passing through the apparatus which might cause the fluid to stagnate or settle in dead spots. As mentioned above, such stagnation or settling of many ingestible fluids permits solidification to occur or encourages germ growth which adversely effects the quality of the fluids.

Another benefit achieved through the provision of the apparatus of the preferred embodiment resides in the ease of assembly and disassembly of the apparatus. By providing means for easily breaking the apparatus down into several parts, cleaning of the apparatus is simplified such that maintenance personnel are able to clean the parts more thoroughly than if the apparatus was cleaned in place in the system.

In order to break the apparatus down into the individual components thereof, the clamp 44 is first removed permitting the upper housing assembly 22 to be removed from the lower housing 20, and allowing the upper stem element 72 to be removed from the hub 70 of the diaphragm 38. Thereafter, the lower interior space 24 may be accessed for cleaning by folding back the diaphragm 38 or by pulling the diaphragm along with the lower stem element 60 and closure member 58 through the inlet conduit 26.

The upper housing assembly 22 may be further broken down by removing the limit stop pin 92 from the upper stem element 72 and the open-lock pin 94 from the sleeve 84, and sliding the upper stem element through the opening 88. Once the upper stem element 72 is removed, the handle 90, sleeve 84, collar 78 and spring 76 may be slid from the upper stem element 72 so that the device is substantially completely broken down.

It is also possible to clean the apparatus while it is in place in the fluid handling system without upsetting the pressure regulating means or the regulation adjustment means by locking the diaphragm 38 and closure member 58 in the flow-permitting position so that cleaning fluid such as steam may be passed through the fluid receiving cavity to carry out a cleaning operation. As mentioned, in order to lock the diaphragm 38 and closure member 58 in the flow-permitting position, the pin 94 is inserted in the hole 96 when the annular groove 98 of the upper stem element 72 is aligned therewith.

In this manner, the diaphragm 38 is locked in the flow-permitting position while the compression spring 76, collar 78, and sleeve 84 are left in their respective adjusted positions so that the pressure level at which the spring is set remains unchanged. Thereafter, when the pin 94 is removed, the apparatus returns to a proper regulating position.

Figure 3:
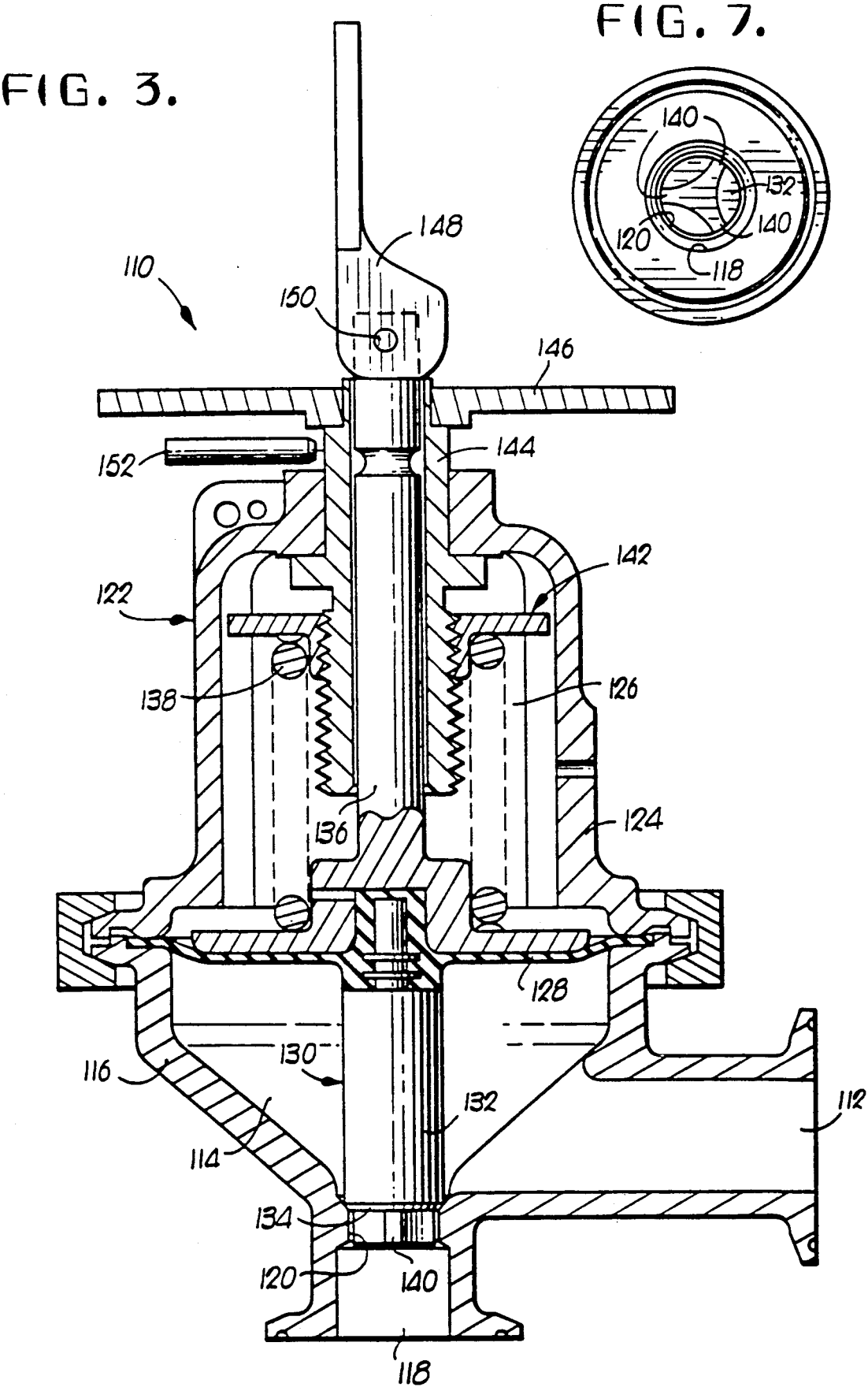
FIG. 3 is a side sectional view of an upstream pressure control valve constructed in accordance with the invention.

An upstream pressure regulating apparatus 110 constructed in accordance with another aspect of the invention is illustrated in FIG. 3. This apparatus is similar to the downstream pressure regulating apparatus 10 discussed above except for several modifications permitting adaptation of the apparatus 110 for use in controlling the pressure of fluid upstream of the apparatus rather than the downstream pressure.

For example, in the upstream pressure regulating apparatus 110, an inlet conduit 112 enters a lower interior space 114 through the side of a lower housing 116 and an outlet conduit 118 is provided at the bottom of the housing and is substantially perpendicular to the inlet conduit 112. The outlet conduit 118 includes a constriction 120 adjacent the lower interior space 114.

An upper housing assembly 122 is provided with an upper housing 124 which includes an interior space 126 that opposes the lower interior space 114 when assembled. A deformable diaphragm 128 separates the interior spaces 114, 126 so that a fluid receiving cavity is defined by the lower interior space and the diaphragm.

A valve 130 includes a valve closure member 132 disposed in the fluid receiving cavity opposite the constriction 120 from the outlet conduit 118. The valve closure member 132 includes an angled closure surface 134 adapted to contact the constriction 120 to prevent the flow of fluid through the outlet conduit 118 when in a flow-preventing position. The closure member 132 is connected to the diaphragm 128 so that the closure member and diaphragm are movable together between a flow-permitting position in which the closure member is separated from the constriction 120 and a flow-preventing position in which the closure member is in engagement with the constriction.

In this manner, the diaphragm 38 is locked in the flow-permitting position while the compression spring 76, collar 78, and sleeve 84 are left in their respective adjusted positions so that the pressure level at which the spring is set remains unchanged. Thereafter, when the pin 94 is removed, the apparatus returns to a proper pressure regulating position.

An upper stem element 136 connects to the diaphragm 128 and extends through the upper interior space 126. The upper stem element 136 includes an upper end disposed exterior of the upper housing 124. The upper housing assembly 122 further includes a pressure regulating spring 138 for exerting a force on the diaphragm 128 in a direction toward the lower interior space 114 such that the closure member 132 is normally biased toward the flow-preventing position.

In this manner, the apparatus 110 prevents the flow of fluid through the outlet conduit 118 unless and until the pressure in the fluid receiving cavity, and thus the inlet conduit 112, is at a pressure above a minimum threshold required to lift the diaphragm 128 and closure member 132 against the force of the compression spring 138 away from contact with the constriction 120. As shown in FIG. 7, a lower end of the closure member 132 defines a plurality of radially extending centering arms 140 which align the closure member with the constriction 120 while permitting flow past the closure member when the angled closure surface 134 is out of contact with the constriction 120.

Regulating adjustment means are provided, as in the downstream apparatus, for adjusting the force exerted on the diaphragm by the compression spring 138, and includes a collar 142, sleeve 144 and handle 146 as described above with reference to the apparatus 10.

Because the closure member 132 prevents the compression spring 138 from pushing the upper stem element 136 through the diaphragm 128, no limit stop is required in the upstream apparatus 110. However, closure member opening means are provided to permit manual movement of the closure member 132 and diaphragm 128 to the flow-permitting position. For example, in the preferred embodiment, a cam lever 148 is provided at the upper end of the stem element 136, and is pivotal about a pin 150 so that, upon pivoting of the cam lever 148, the stem element 136 is raised relative to a sleeve 144 of the regulating adjustment means. This movement of the stem element 136 pulls the diaphragm 128 and closure member 132 away from the constriction 120 to the flow-permitting position and a pin 152 may be used to lock the stem element 136 in place. Thereafter, cleaning of the fluid receiving cavity may be carried out without upsetting the present position of the pressure regulating means.

Although the beneficial results achieved from the use of either the upstream or downstream pressure regulating valve apparatuses are not repeated here with reference to the upstream embodiment, it is understood that the same benefits are realized by both embodiments and that the only differences between the two constructions are those necessary to permit the downstream apparatus to be used in an upstream pressure regulating environment.

Whereas the invention has been described with reference to the illustrated preferred embodiment, it is noted that substitutions may be made and equivalents employed herein without departing from the scope of the invention as set forth in the claims.

What is claimed is:

1. A fluid pressure regulating valve apparatus comprising:
 a lower housing including a lower interior space;
 an upper housing assembly including an upper housing defining an upper interior space;
 a deformable diaphragm separating the lower interior space from the upper interior space and, together with the lower interior space, defining a fluid receiving cavity;
 a first conduit in fluid communication with the fluid receiving cavity, the first conduit defining a first conduit axis;

a second conduit in fluid communication with the fluid receiving cavity, the second conduit defining a second conduit axis;

a valve including a valve closure member connected to the diaphragm so that the closure member and diaphragm are movable together between a flow-permitting position and a flow-preventing position;

a bearing plate disposed within the upper interior space and being attached to the diaphragm so as to be movable with the diaphragm relative to the upper housing assembly, the upper housing assembly further including pressure regulating means interposed between the upper housing and the bearing plate for exerting a force on the bearing plate and diaphragm in a direction toward the lower interior space, regulating adjustment means for adjusting the force exerted on the bearing plate and diaphragm by the pressure regulating means, limit stop means for limiting the movement of the diaphragm in the direction of the force of the pressure regulating means, and lock-open means for locking the diaphragm in the flow-permitting position;

means for detaching the bearing plate from the diaphragm in order to enable removable of the upper housing assembly and the bearing plate together from the lower housing so that the fluid receiving cavity is accessible for cleaning; and means for retaining the bearing plate on the upper housing assembly upon removal of the upper housing assembly and bearing plate from the lower housing in order to maintain the force exerted on the bearing plate by the pressure regulating means.

2. The fluid pressure regulating valve as recited in claim 1, wherein the lower interior space includes a surface adapted to be exposed to fluids being controlled by the apparatus, the surface having a roughness of less than about $15R_a$.

3. The fluid pressure regulating valve as recited in claim 1, wherein the diaphragm is removably retained between the lower and upper housing, the apparatus further comprising securing means for securing the lower housing to the upper housing with the diaphragm interposed therebetween, the securing means being removable for permitting disassembly of the apparatus.

4. The fluid pressure regulating valve as recited in claim 1, wherein the diaphragm includes an annular diaphragm body having a thickness of less than about 40/1000 of an inch.

5. The fluid pressure regulating valve as recited in claim 1, wherein the axis of the second conduit is substantially perpendicular to the axis of the first conduit.

6. The fluid pressure regulating valve as recited in claim 1, wherein the pressure regulating means includes a compression spring retained in the upper interior space and positioned to exert a force on the bearing plate.

7. The fluid pressure regulating valve as recited in claim 6, wherein the regulating adjustment means includes positioning means for changing the position of the compression spring within the upper interior space so that the force exerted on the diaphragm by the spring is adjusted.

8. The apparatus as recited in claim 1, wherein the regulating adjustment means includes positioning means for changing the position of the compression spring within the upper interior space so that the force exerted on the diaphragm by the spring is adjusted.

9. An apparatus for regulating the downstream pressure of a fluid being controlled by the apparatus, the apparatus comprising:

a lower housing including a lower interior space;

an upper housing assembly including an upper housing defining an upper interior space;

a deformable diaphragm separating the lower interior space from the upper interior space, and together with the lower interior space defining a fluid receiving cavity;

an inlet conduit in fluid communication with the fluid receiving cavity, the inlet conduit defining an inlet axis and including a constriction;

an outlet conduit in fluid communication with the fluid receiving cavity, the outlet conduit defining an outlet axis, a valve including a valve closure member disposed in the inlet conduit opposite the constriction from the fluid receiving cavity, and a lower stem element extending between the valve closure member and the diaphragm so that the closure member and diaphragm are movable together between a flow-permitting position in which the closure member is separated from the constriction and a flow-preventing position in which the closure member is in engagement with the constriction;

a bearing plate disposed within the upper interior space and being attached to the diaphragm so as to be movable with the diaphragm relative to the upper housing assembly, the upper housing assembly further including pressure regulating means for exerting a force on the diaphragm in a direction toward the lower interior space, regulating adjustment means for adjusting the force exerted on the bearing plate and diaphragm by the pressure regulating means, limit stop means for limiting the movement of the diaphragm in the direction of the force of the pressure regulating means, and lock-open means for locking the diaphragm in the flow-permitting position;

means for detaching the bearing plate from the diaphragm in order to enable removal of the upper housing assembly and the bearing plate together from the lower housing so that the fluid receiving cavity is accessible for cleaning; and means for retaining the bearing plate on the upper housing assembly upon removal of the upper housing assembly and bearing plate from the lower housing in order to maintain the force exerted on the bearing plate by the pressure regulating means.

10. The apparatus as recited in claim 9, wherein the lower interior space includes a surface adapted to be exposed to fluids being controlled by the apparatus, the surface having a roughness of less than about $15R_a$.

11. The apparatus as recited in claim 9, wherein the diaphragm is removably retained between the lower and upper housings, the apparatus further comprising securing means for securing the lower housing to the upper housing with the diaphragm interposed therebetween, the securing means being removable for permitting disassembly of the apparatus.

12. The apparatus as recited in claim 9, wherein the axis of the inlet conduit is substantially perpendicular to the axis of the outlet conduit.

13. The apparatus as recited in claim 9, wherein the pressure regulating means includes a compression spring retained in the upper interior space between the upper housing and the bearing plate and positioned to exert a force on the bearing plate and diaphragm.

14. The apparatus as recited in claim 13, wherein the regulating adjustment means includes positioning means for changing the position of the compression spring within the upper interior space so that the force exerted on the diaphragm by the spring is adjusted.

15. The apparatus as recited in claim 9, wherein the regulating adjustment means includes positioning means for changing the position of the compression spring within the upper interior space so that the force exerted on the diaphragm by the spring is adjusted.

16. A fluid pressure regulating valve apparatus comprising:
   a lower housing including a lower interior space;
   an upper housing assembly including an upper housing defining an upper interior space;
   a deformable diaphragm separating the lower interior space from the upper interior space and, together with the lower interior space, defining a fluid receiving cavity;
   a first conduit in fluid communication with the fluid cavity, the first conduit defining a first conduit axis;
   a second conduit in fluid communication with the fluid receiving cavity, the second conduit defining a second conduit axis;
   a valve including a valve closure member connected to the diaphragm so that the closure member and diaphragm are movable together between a flow-permitting position and a flow-preventing position; and
   a bearing plate disposed within the upper interior space and being attached to the diaphragm so as to be movable with the diaphragm relative to the upper housing assembly,
   the upper housing assembly further including pressure regulating means interposed between the upper housing and the bearing plate for exerting a force on the bearing plate and diaphragm in a direction toward the lower interior space, regulating adjustment means for adjusting the force exerted on the bearing plate and diaphragm by the pressure regulating means, limit stop means for limiting the movement of the diaphragm in the direction of the force of the pressure regulating means, lock-open means for locking the diaphragm in the flow-permitting position, and an annular bearing surface, and the bearing plate includes structure for engaging the bearing surface to limit the movement of the bearing plate relative to the upper housing assembly in the direction of the force f the pressure regulating means.

17. An apparatus for regulating the downstream pressure of a fluid being controlled by the apparatus, the apparatus comprising:
   an lower housing including a lower interior space;
   an upper housing assembly including an upper housing defining an upper interior space;
   a deformable diaphragm separating the lower interior space from the upper interior space, and together with the lower interior space, defining a fluid receiving cavity;
   an inlet conduit in fluid communication with the fluid receiving cavity, the inlet conduit defining an inlet axis and including construction;
   an outlet conduit in fluid communication with the fluid receiving cavity, the outlet conduit defining an outlet axis,
   a valve including a valve closure member disposed in the inlet conduit opposite the constriction from the fluid receiving cavity, and a lower stem element extending between the valve closure member and the diaphragm so that the closure member and diaphragm are movable together between a flow-permitting position in which the closure member is separated from the constriction and a flow-preventing position in which the closure member is in engagement with the constriction; and
   a bearing plate disposed within the upper interior space and being attached to the diaphragm so as t be movable with the diaphragm relative to the upper housing assembly, the upper housing assembly further including pressure regulating means for exerting a force on the diaphragm in a direction toward the lower interior space, regulating adjustment means for adjusting the force exerted on the bearing plate and diaphragm by the pressure regulating means, limit stop means for limiting the movement of the diaphragm in the direction of the force of the pressure regulating means, lock-open means for locking the diaphragm in the flow-permitting position, and an annular bearing surface, and the bearing pate includes structure for engaging the bearing surface to limit the movement of the bearing plate relative to the upper housing assembly in the direction of the force of the pressure regulating means.

* * * * *